(12) United States Patent
Okuda

(10) Patent No.: US 6,410,623 B1
(45) Date of Patent: Jun. 25, 2002

(54) THERMOPLASTIC ELASTOMER RESIN COMPOSITION

(75) Inventor: Ryoichi Okuda, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/489,470

(22) Filed: Jan. 21, 2000

(30) Foreign Application Priority Data

Jan. 22, 1999 (JP) .......................................... 11-015030

(51) Int. Cl.$^7$ ................................................ C08L 47/00
(52) U.S. Cl. ..................... 524/261; 524/267; 524/474; 524/491; 525/97; 525/98; 525/240
(58) Field of Search ................. 525/98, 97, 240; 524/505, 261, 267, 474, 491

(56) References Cited

U.S. PATENT DOCUMENTS 4,212,787 A * 7/1980 Matsuda et al. ............ 525/240
4,247,652 A * 1/1981 Matsuda et al. ............ 525/240
6,162,868 A * 12/2000 Radigon et al. .............. 525/94

* cited by examiner

Primary Examiner—Morton Foelak
(74) Attorney, Agent, or Firm—Smith, Gambrell & Russell, LLP

(57) ABSTRACT

A thermoplastic elastomer resin composition that is flexible and has superior wear resistant, oil resistant and appearance suited for automotive interior materials, and does not contain chlorine. The composition contains (a) 100 parts by weight of a block polymer composed of at least two polymeric blocks A (primarily vinyl aromatic compounds) and at least one polymeric block B (primarily conjugate diene compounds); (b) 50–170 parts by weight of a polyolefin-based resin; (c) 100–300 parts by weight of non-aromatic plasticizer for rubber; (d) 50–170 parts by weight of a thermoplastic elastomer composition containing crystalline polyolefin resin and completely or partially crosslinked ethylene-α-olefin polymer (e) 5–50 parts by weight of silicon oil whose viscosity is 50,000 centistoke or more.

16 Claims, 1 Drawing Sheet

THERMOPLASTIC ELASTOMER RESIN COMPOSITION

INTRODUCTION AND BACKGROUND

The present invention relates to thermoplastic elastomer compositions that are suitable for application to gearshift knobs, assist grips, armrests and other automotive interior features that require superior flexibility, wear resistance, oil resistance, and desirable appearance.

Recently, thermoplastic elastomer resins that are rubber-like, but do not require curing, and have workability similar to that of thermoplastics have been receiving much attention for applications such as automotive, home appliances, and construction materials. Furthermore, vinyl chloride resin-based elastomers that have been traditionally used for automotive interior materials are suspected as containing environmentally harmful plasticizers and sources of dioxin when burned. Accordingly, the movement towards replacing such materials with more environmentally friendly, non-vinyl chloride elastomers is becoming increasingly popular. Because automotive interior materials frequently come into close physical contact with human hands, the point in developing alternative materials is to bring the wear resistance as close as possible to that of vinyl chloride materials. In the case of thermoplastic elastomers, it is well known that the wear resistance increases if the hardness is made extremely high, but that does not provide the feel of vinyl chloride materials; therefore, the development of more flexible and fairly wear resistant non-vinyl chloride elastomers is sought.

Polyurethane-based resins are known to have superior wear resistance, but are not desirable as environmentally friendly materials because they produce hazardous gases when burned. They also have inferior forming stability.

Attempts also have been made to add an organic lubricant, such as a higher fatty acid amide or low viscous silicone, to olefin-based and styrene-based thermoplastic elastomers in order to increase the surface smoothness of formed articles, and thereby improve their wear resistance. However, because these materials migrate to the surface of the formed articles over time or through heat, the appearance of the formed articles is adversely affected and the expected wear resistance is not achieved.

An object of the present invention is to avoid the above problems associated with conventional techniques and provide thermoplastic-resin compositions that can be used as automotive interior materials, and which are more flexible and wear resistant, have good oil resistance and pleasing appearance, and do not contain chlorine and therefore are environmentally friendly.

SUMMARY OF THE INVENTION

The above and other objects of the present invention can be achieved by a thermoplastic elastomer resin composition comprising
  (a) 100 parts by weight of a block polymer composed of at least two polymeric blocks A (primarily vinyl aromatic compounds) and at least one polymeric block B (primarily conjugated diene compounds), wherein said vinyl aromatic compound content falls within the range of 5–70% by weight and 70% or more of said conjugated diene compound portion is hydrogenated;
  (b) 50–170 parts by weight of a polyolefin-based resin whose melt flow rate (ASTM-D-1238L condition at 230° C.) is 1–40 g per 10 minutes;
  (c) 100–300 parts by weight of a non-aromatic plasticizer for rubber;
  (d) 50–170 parts by weight of a thermoplastic elastomer composition containing crystalline polyolefin and completely or partially crosslinked ethylene-α-olefin polymer, wherein said α-olefin polymer density falls in the range of 0.858–0.915 g/cm$^3$ and the molecular weight distribution (M/Mn) (weight average molecular weight (M) over number average molecular weight (Mn)) is less than 3.0; and
  (e) 5–50 parts by weight of silicone oil whose viscosity (JIS Z8803 at 25° C.) is 50,000 centistoke or more.

It is desirable from the above defined thermoplastic elastomer resin composition to contain an ethylene-α-olefin polymer in the constituent (d) which is manufactured by using a metallocene-based catalyst.

BRIEF DESCRIPTION OF DRAWING

The present invention will be further understood with reference to the drawing; wherein.

DETAILED DESCRIPTION OF THE INVENTION

Figure 1:
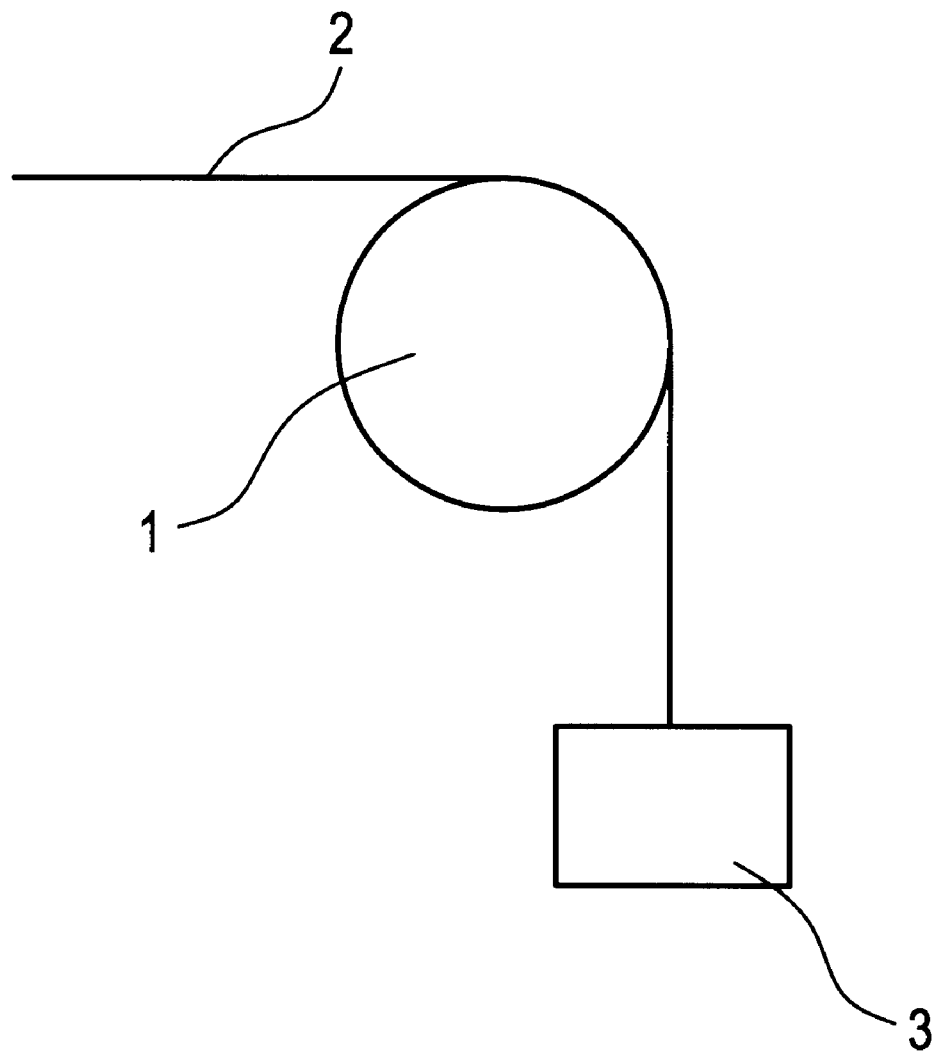
FIG. 1 is a schematic diagram showing the curved-surface sliding abrasion test method used in evaluating the composition of the present invention.

The present invention will now be described in farther detail.

In FIG. 1, a bar shaped test piece 1 of the composition of the invention is tested by suspending a load or weight 3 from a cloth or flexible material 2 that enables evaluating the wear resistance of the test piece 1.

The hydrogenated block copolymer used in the constituent (a) of the present invention must have at least two polymer blocks A (primarily vinyl aromatic compounds) and at least one polymer block B (primarily conjugated diene compounds), in which the vinyl aromatic compound content is in the range of 5–70% by weight and 70% or more of the conjugated diene compound portion is hydrogenated.

The form of the hydrogenated block copolymer is expressed as, for example, (A-B)n-A (n represents integer of 1–5), or (A-B)m-X (X represents coupling agent residue and m represents integer of 2–6). As for the vinyl aromatic compounds comprising the block copolymer prior to hydrogenation, one or more types are selected from styrene, α-methyl styrene, o-, m-, or p-methylstyrene, vinyl naphthalene, vinyl anthracene, or the like, and mixtures thereof among which styrene is preferred.

As for the conjugated diene compounds, one or more types are selected from 1,3-butadiene, isoprene, 2,3-dimethyl-1,3-butadiene, 1,3-pentadiene, 1,3-hexadiene, and the like, and mixtures thereof among which isoprene or butadiene or a combination thereof is preferred. The microstructure of polymeric block B (primarily conjugate diene compounds) is not particularly limited, but its degree of vinylation is preferably 70% or less.

The molecular structure of the block copolymer may be linear or branched, and a block copolymer expressed as (A-B)n (n represents integer of 1–5) may be added to the block copolymer of the above form, as needed.

In said block copolymer, the ratio of vinyl aromatic compound content: conjugated diene compound content is in the range of 5:95–70:30. Sufficient rubber elastic material cannot be obtained if the ratio falls out of this range. As for the molecular weight of the block copolymer, 50,000–300, 000 is preferred, and 150,000–300,000 is even more preferable. If the molecular weight is below 50,000, the strength of the formed article is reduced, and if it exceeds 300,000, the workability is reduced.

By hydrogenating said block copolymer through known methods, such as the method disclosed in Japanese Laid-Open Patent Publication No. 42-8704 (relied on and incorporated herein by reference), a hydrogenated block copolymer in which 70% or more of the conjugated diene compound portion is hydrogenated can be obtained. If the hydrogenation rate of the conjugated diene compound portion is less than 70%, the hydrogenated block copolymer would have inferior heat aging property and weather resistance, and thus be undesirable. The desirable hydrogenation rate is 90% or more.

The hydrogenated block copolymer may be further modified by integrating positive groups, such as hydroxyl group, carboxyl group, epoxy group or the like, into the molecular chain.

Polyolefin-based resin used as constituent (b) of the present invention is a necessary constituent for adding workability, heat resistance and oil resistance to the thermoplastic elastomer composition. Specific polyolefin-based resins include polypropylene; polyethylene; random or block copolymers of propylene and a small amount of α-olefin, more specifically propylene-ethylene copolymer, propylene-1-1-hexene copolymer, and propylene-4-methyl-1pentene copolymer; poly 4-methyl-1-pentene; and polybutene-1, of which polypropylene is preferable for its heat resistance.

The melt flow rate (MFR) of the polyolefin-based resin used is 1–40 g/10 min. (ASTM-D-1238L conditions at 230° C.), and more preferably in the range of 10–25 g/10 min. An MFR below 1 g/10 minutes reduces workability, while an MRF of over 40 g/10 minutes reduces heat resistance.

The formulation proportion of constituent (b) is 50–170 parts by weight per 100 parts by weight of constituent (a), and more preferably 90–130 parts by weight. If it is less than 50 parts by weight, the workability and oil resistance decline, while exceeding 170 parts by weight reduces flexibility in addition to producing poor appearance with uneven luster, which is undesirable. In addition, it is desirable to have the polyolefin-based resin contain a nucleus forming agent for controlling the characteristics change during high-temperature aging and weather resistance tests.

Constituent (c), a non-aromatic plasticizer for rubber, used in the present invention is an essential ingredient for adjusting the hardness of and providing flexibility to the composition, and non-aromatic-based mineral oil, or liquid or low-molecular weight synthetic plasticizer is suitable. More specifically, paraffin-based process oil is desirable. A non-aromatic-based substance has 30% or less aromatics content. If the content of aromatics in the plasticizer exceeds 30%, the thermoplastic elastomer composition's shape recovery characteristics at high temperatures declines, which is not desirable. The desirable paraffin-based process oil has a viscosity of 20–500 cst at 37.8° C., a pour point of −10–15° C., and a firing point of 170–300° C.

The proportion of the non-aromatic plasticizer for rubber, constituent (c), is 100–300 parts by weight per 100 parts by weight of constituent (a), and preferably 150–250 parts by weight. If the content of constituent (c) is less than 100 parts by weight, the hardness of the composition obtained is high and the flexibility low, which is undesirable. If the content exceeds 300 parts by weight, the plasticizer tends to bleed out, which may make the finished product sticky, in addition to reducing mechanical characteristics and wear resistance.

The present invention's constituent (d), ethylene-α-olefin polymer, is a polymer composed of α-olefin with 3–12 carbon atoms and ethylene, and has specific density and molecular weight distribution. The olefin-based copolymers used in the present invention can be manufactured by using the known metallocene-based catalyst; a different polymerization catalyst is used, as compared to conventional Ziegler catalyst, and the characteristics of the polymer obtained are significantly different.

Some of the characteristics of olefin-based polymers using the metallocene-based catalyst are listed below.

1) Because the polymerization catalyst is hyperactive, comonomer α-olefin composition can be significantly increased to thereby produce extremely flexible elastomer polymers, even in the state not containing a plasticizer.
2) As compared to Ziegler-based polymers, the comonomer distribution is uniform.
3) As compared to Ziegler-based polymers, the molecular weight distribution is extremely sharp; the low molecular weight constituent content is extremely small and it has superior wear resistance, mechanical strength, and workability, and thus high quality.
4) Despite the sharp molecular weight distribution, when a long chain branch is integrated the ratio of melt index (I10) 190° C./10 kgf to the melt index (I2) 190° C./2.16 kgf by ASTM D1238 (I10/I2) is large, providing superior workability. α-olefins with 3–12 carbon atoms include propylene, butene-1, pentene-1, hexene-1, 4-methylpentene-1, heptene-1, octane-1, nonene-1, decene-1, undecene-1, and dodecene-1; α-olefins with 4–12 carbon atoms are more preferable.

Metallocene-based catalyst is composed of a cyclopentadienyl derivative of a group IV metal, such as titanium or zirconium, and a co-catalyst. It is not only hyperactive as a polymerization catalyst, but also produces polymers with narrower molecular weight distribution, uniform distribution of α-olefin with 3–12 carbon atoms that is the comonomer in the copolymer, and uniform catalyst type as compared to conventional catalysts, such as Ziegler-based catalyst.

As for ethylene α-olefin copolymers by means of Ziegler catalyst, said melt index ratio (I10/I2) and molecular weight distribution show a substantially linear proportional relationship; as the melt index ratio increases, the molecular weight distribution tends to increase as well. In this case, the molecular weight distribution is about 3–10.

On the other hand, with the ethylene α-olefin copolymer by means of metallocene catalyst, regardless of the melt index ratio, the molecular weight distribution remains sharp at less than 3.0, containing extremely small amounts of low molecular weight constituents. For this reason, the mechanical strength, wear resistance, and workability of the ethylene α-olefin copolymer comprising constituent (d) of the present invention are superior.

The ethylene α-olefin copolymer used in the present invention has 0.858–0.915 g/cm$^3$ density. Olefin-based polymers within this density range provide thermoplastic resin compositions with high flexibility and high mechanical strength.

There is no restriction on the MFR of the ethylene α-olefin copolymer used in the present invention, but 0.01–100 g/10 min. (190° C., 2.16 kg load) is preferable, and 0.05–50 g/10 min. is even more preferable.

The crystalline polyolefin resins comprising constituent (d) of the present invention can be polypropylene, polyethylene, propylene, random or block copolymers of propylene and a small amount of α-olefin, poly 4-methyl-1-pentene, and polybutene-1, of which polypropylene is preferable for its heat resistance.

The preferable weight ratio of the ethylene α-olefin copolymer: crystalline polyolefin resin=95:5–25:75. If the proportion of the ethylene α-olefin copolymer is smaller than that, the characteristics are not fully utilized, and thus it is not desirable.

The ethylene α-olefin copolymer in constituent (d) of the present invention must be fully or partially crosslinked. This can further increase wear resistance, oil resistance and heat resistance.

There are no special restrictions for the crosslinking methods; a method such as the following can be used. After the crystalline polyolefin resin is melted, the ethylene α-olefin copolymer is mixed in, a crosslinking agent is added, and the mixture is further melted and kneaded. As for the crosslinking agents, organic peroxides are preferable, and the joint use of a crosslinking assistant is more preferable. Specific examples of preferable organic peroxides include peroxy ketols, dialkyl peroxides, diacyl peroxides, peroxy esters, and hydroperoxides. Of these, 1,1-bis(t-butylperoxy)-3,5,6-trimethylcyclohexane; di-t-butylperoxide; dicumene peroxide; 2,5-dimethyl -2,5-bis(t-butylperoxy)hexane; and 2,5-dimethyl -2,5-bis(t-butylperoxy) hexane are preferable. Preferable crosslinking assistants include divinyl benzene, triallylisocyanulate, triallylcyanulate, diacetone diacrylamide, polyethylene glycol diacrylate, polyethylene glycol dimethacrylate, trimethylol propane trimethacrylate, trimethylol propane triacrylate, ethylene glycol dimethacrylate, triethylene glycol dimethacrylate, diisopropenyl benzene, P-quinone dioxime, phenyl maleimide, and allylmethacrylate. These organic peroxides and crosslinking assistants are preferably used in proportions of 0.02–10 parts by weight, and more preferably 0.05–5 parts by weight, per 100 parts by weight of ethylene α-olefin copolymer.

The formulation amount of constituent (d) in the present invention is 50–170 parts by weight, more preferably 90–130 parts by weight, per 100 parts by weight of constituent (a). If the amount is less than 50 parts by weight, oil resistance and appearance are inferior, and if over 170 parts by weight strength declines along with the wear resistance.

Silicone oil, constituent (e), of the present invention is an ingredient for providing wear resistance to thermoplastic elastomers and preventing stickiness, which is unique to elastomers. There are no limitations for the type of substituents linked by siloxane principle chain in the molecular structure of the silicone oil; those preferred are dimethyl silicone oil, methylphenyl silicone oil, and alkyl modified silicone oil.

The viscosity of the silicone oil is 50,000 cst or greater, more preferably 100,000 cst or greater. If the viscosity of the silicone oil is below 50,000 cst, the effectiveness in increasing wear resistance is minimal or the migration to the shaped article's surface is increased over time, which is undesirable.

The formulation amount of constituent (e) is 5–50 parts by weight, more preferably 15–40 parts by weight, per 100 parts by weight of constituent (a). If the amount is less than 5 parts by weight, the improvement of wear resistance and stickiness is insufficient, and if over 50 parts by weight the composition's mechanical strength is reduced and furthermore becomes economically undesirable. When using silicone oil, it is desirable to mix it in with thermoplastic resin, such as polypropylene, in advance in order to facilitate dispersion and workability.

In addition to said constituents (a)–(e), nucleus forming agent, external lubricant, internal lubricant, UV absorbent, hindered amine-based light stabilizer, hindered phenol-based antioxidant, coloring agent, and the like may be added as needed to the composition, according to the present invention.

As for the manufacturing method for the composition according to the present invention, general methods used for manufacturing regular resin and rubber compositions may be employed. These basically involve mechanical melting and kneading by using uniaxial extruders, biaxial extruders, mixers, benders, kneaders, rolls, and the like. There are no restrictions for the order in which the constituents are added; all constituents may be mixed in advance in a mixer or blender before melting and kneading, or selective constituents may be mixed in advance and then melted and kneaded into a master batch to which the remaining constituents are added and kneaded. Furthermore, the desirable melting and kneading temperature may be chosen from the 180–300 degree C range.

The thermoplastic elastomer resin composition obtained is fed into an injection molding machine, which is equipped with a die for quick injection molding to obtain formed articles such as gear shift knobs. Furthermore, unnecessary sections of the formed articles such as burr, runner and spool sections can be recycled because the composition is thermoplastic, which is advantageous for reusing materials from automotive interior materials.

The present invention will be explained in detail by referring to some embodiments, but the present invention is not limited to these embodiments.

Various embodiments and comparative examples are formulated by using the following constituents.

Constituent a—1: A block copolymer having a structure of polystyrene-hydrogenated polyisoprene-polystyrene made by Kuraray. Bound styrene content: 30% by weight, number average molecular weight: 200,000, hydrogenation rate: 98% or more.

Constituent a—2: A block copolymer having a structure of polystyrene-hydrogenated polyisoprene-polystyrene made by Kuraray. Bound styrene content: 30% by weight, number average molecular weight: 70,000, hydrogenation rate: 98% or more.

Constituent b—1: Homopolypropyrene made by Japan Polyolefin. Melt flow rate of 15 g/10 min. (ASTM D1238)

Constituent b—2: Homopolypropyrene made by Japan Polyolefin. Melt flow rate of 0.5 g/10 min. (ASTM D1238)

Constituent c: Diana process oil made by Idemitsu Kosan. Paraffin-based process oil. Dynamic viscosity: 381.6 cst (40° C.), 30.1 (100° C.). Average molecular weight 746. Ring analysis value: CA (double-bonded section in the ring)=0%, CN (sections other than double bond in the ring)=27%, CP (straight chain section)=73%.

Constituent d: A thermoplastic composition obtained by crosslinking the composition composed of 60% by weight of isotactic polypropylene and 40% by weight of ethylene α-olefin copolymer by using an organic peroxide made by Asahi Chemical Industries. MFR 1.8 g/10 min. Density 0.875 g/cm$^3$, hardness 70, (ethylene α-olefin copolymer: α-olefin comonomer=octane-1, density 0.868 g/cm$^3$, Mw/Mn=2.3)

Constituent e—1: Silicone oil made by Shinnetsu Chemical. Viscosity 100,000 cst (25° C.), relative density 0.677 (25° C.), index of refraction 1.403 (25° C.), pour point −50° C. or lower.

Constituent e—2: Silicone oil made by Shinnetsu Chemical. Straight silicone oil. Viscosity 100,000 cst (25° C.), relative density 0.975 (25° C.), index of refraction 1.403 (25° C.), pour point −50° C. or lower.

The embodiments 1–6 and comparative examples 1–10 formulated respectively as shown in Table 1–3 were sufficiently dry blended, melted and kneaded by using biaxial kneader under the conditions so as to obtain the resin temperature of 180–270° C., and then extruded and pelletized. The pellets were evaluated as follows.

(1) Hardness (JIS K6301): Press sheets were made from the pellets for measurement.

(2) Appearance: Test pieces (100 mm×100 mm×20 mm thickness) were made from the pellets by using an injection molding machine. Appearance characteristics, such as flow mark and lustre, were visually evaluated immediately after molding and after 400 hours of high-temperature aging test at 110° C. Good pieces are marked with circles, somewhat poor pieces are marked with triangles, and poor ones are marked with an X.

(3) MFR: pellets were used for measurements. ASTM-D-1238L, 230° C.

(4) Oil resistance test: the test pieces used for hardness measurements were dipped in flowing paraffin oil (80° C., 72 hours), and the volume change was measured.

(5) Abrasion test: By using an injection molding machine, crimped bar-shaped test pieces were prepared. The test pieces were evaluated by using a curved-surface sliding abrasion testing method as shown in FIG. 1. Opposing material: regular cotton cloth No. 10, load: 1 kg, speed: 25 reciprocation/min. The number of reciprocations until the crimped sections on the surface were completely worn were counted.

The test results for the embodiments are shown in Table 1, and for the comparative examples in Table 2, 3. The results show that the compositions obtained according to the present invention are more flexible and have superior wear resistance.

The resin compositions according to the present invention are flexible, and have superior wear resistance, good oil resistance and appearance. In addition, because the compositions do not contain chlorine, no hazardous gases are emitted when burned, and so they can replace vinyl chloride resins traditionally used for automotive interior materials such as gearshift knobs, assist grips, and armrests as well as other components that will be readily apparent to those skilled in the art.

TABLE 1

| Embodiments | 1 | 2 | 3 | 4 | 5 | 6 |
|---|---|---|---|---|---|---|
| Constituent a - 1 | 100 | 100 | 100 | 100 | 0 | 100 |
| Constituent a - 2 | 0 | 0 | 0 | 0 | 100 | 0 |
| Constituent b - 1 | 100 | 130 | 100 | 100 | 100 | 90 |
| Constituent c | 200 | 250 | 150 | 200 | 200 | 220 |
| Constituent d | 100 | 100 | 130 | 100 | 100 | 120 |
| Constituent e - 1 | 20 | 20 | 20 | 40 | 30 | 15 |
| Hardness | 70 | 72 | 72 | 72 | 70 | 66 |
| Appearance: immediately after forming | ○ | ○ | ○ | ○ | ○ | ○ |
| : after heat aging test | ○ | ○ | ○ | ○ | ○ | ○ |
| MFR (g/10 min.) | 20 | 26 | 18 | 17 | 28 | 20 |
| Oil resistance: volume change (%) | 40 | 30 | 45 | 40 | 40 | 35 |
| Wear resistance: number of reciprocation until crimped section is worn | 1000 | 1000 | 1000 | 1300 | 1200 | 1000 |

TABLE 2

| Comparative examples | 1 | 2 | 3 | 4 | 5 | 6 |
|---|---|---|---|---|---|---|
| Constituent a - 1 | 100 | 100 | 100 | 100 | 100 | 100 |
| Constituent b - 2 | 0 | 100 | 0 | 0 | 0 | 0 |
| Constituent c | 200 | 90 | 90 | 340 | 100 | 200 |
| Constituent d | 100 | 100 | 100 | 100 | 0 | 180 |
| Constituent e - 1 | 20 | 20 | 20 | 20 | 20 | 20 |
| Hardness | 85 | 70 | 89 | 60 | 86 | 65 |
| Appearance: immediately after forming | Δ | Δ | ○ | X | Δ | ○ |
| : after heat aging test | Δ | Δ | ○ | X | X | ○ |
| MFR (g/10 min.) | 32 | 3 | 15 | 30 | 10 | 15 |
| Oil resistance: volume change (%) | 30 | 40 | 80 | 70 | 100 | 35 |
| Wear resistance: number of reciprocation until crimped section is worn | 1300 | 1000 | 1200 | 600 | 800 | 700 |

TABLE 3

| Comparative examples | 7 | 8 | 9 | 10 |
|---|---|---|---|---|
| Constituent a - 1 | 100 | 100 | 100 | 100 |
| Constituent b - 1 | 100 | 100 | 100 | 40 |
| Constituent c | 100 | 200 | 200 | 250 |
| Constituent d | 100 | 100 | 100 | 40 |
| Constituent e - 1 | 0 | 0 | 3 | 20 |
| Constituent e - 2 | 0 | 35 | 0 | 0 |
| Hardness | 80 | 70 | 68 | 50 |
| Appearance: immediately after forming | ○ | Δ | ○ | X |
| : after heat aging test | ○ | X | ○ | X |
| MFR (g/10 in.) | 15 | 23 | 25 | 5 |
| Oil resistance: volume change (%) | 50 | 40 | 40 | 150 |
| Wear resistance: number of reciprocation until crimped section is worn | 500 | 700 | 700 | 300 |

Further variations and modifications of the foregoing will be apparent to those skilled in the art and are intended to be encompassed by the claims appended hereto.

Japanese priority application 11-015030 is relied on and incorporated herein by reference.

What is claimed is:

1. A thermoplastic elastomer resin composition comprising (a) 100 parts by weight of block polymer composed of at least two polymeric blocks A (primarily vinyl aromatic compounds) and at least one polymeric block B (primarily conjugated diene compounds), wherein said vinyl aromatic compound content falls within the range of 5–70% by weight and at least 70% of said conjugate diene compound portion is hydrogenated;

(b) 50–170 parts by weight of a polyolefin-based resin whose melt flow rate (ASTM-D-1238L condition at 230° C.) is 1–40 g per 10 minutes;

(c) 100–300 parts by weight of a non-aromatic plasticizer for rubber;

(d) 50–170 parts by weight of a thermoplastic elastomer composition containing crystalline polyolefin and completely or partially crosslinked ethylene-α-olefin polymer, wherein said α-olefin polymer density falls in the range of 0.858–0.915 g/cm$^3$ and the molecular weight distribution (M/Mn) (weight average molecular weight (Mw) over number average molecular weight Mn)) is less than 3.0; and (e) 5–50 parts by weight of silicone oil whose viscosity (JIS Z8803 at 25° C.) is at least 50,000 centistoke.

2. A thermoplastic elastomer resin composition according to claim 1, wherein said ethylene-α-olefin polymer in the constituent (d) is manufactured by using a metallocene-based catalyst.

3. The thermoplastic elastomer resin composition according to claim 1, wherein said vinyl aromatic compound is a member selected from the group consisting of styrene, α-methyl styrene, ortho-methyl styrene, meta-methyl styrene, para-methyl styrene, vinyl mephthalene, vinyl anthracene and mixtures thereof.

4. The thermoplastic elastomer resin composition according to claim 1 wherein said conjugated diene is a member selected from the groups consisting of 1,3-butadiene, isoprene, 2,3-dimethyl-1,3-butadiene, 1,3-pentadiene, 1,3-hexadiene, and mixtures thereof.

5. The thermoplastic elastomer resin composition according to claim 1 wherein the ratio of vinyl aromatic compound to conjugated diene is 5:95 to 70:30.

6. The thermoplastic elastomer resin composition according to claim 1 wherein the molecular weight of the block polymer is 50,000 to 300,000.

7. The thermoplastic elastomer resin composition according to claim 1 wherein the conjugated diene is hydrogenated to 90% or more.

8. The thermoplastic elastomer resin composition according to claim 1 wherein the polyolefin has a melt flow rate of 1–40 g/10 min.

9. The thermoplastic-elastomer resin composition according to claim 8 wherein said melt flow rate is 10–25 g/10 min.

10. The thermoplastic elastomer resin composition according to claim 1 wherein the polyolefin is present in 90 to 130 parts by weight.

11. The thermoplastic-elastomer resin composition according to claim 1 wherein the non-aromatic plasticizer is a paraffin-based process oil with a viscosity of 20–500 cst at 37.8° C.

12. The thermoplastic elastomer resin composition according to claim 1 wherein the plasticizer is present in the amount of 150–250 parts by weight.

13. The thermoplastic elastomeric resin composition according to claim 1 wherein the ethylene-α-olefin polymer is made in the presence of a metallocene-based catalyst.

14. The thermoplastic elastomer resin composition according to claim 1 wherein the ratio of ethylene α-olefin copolymer to crystalline polyolefin is 95:5–25:75.

15. An article found of the thermoplastic-elastomer resin composition of claim 1.

16. A method of making the thermoplastic polymer resin composition of class 1 comprising:
   kneading together components (a) through (e) to form a batch, feeding said batch into an injection molding machine and injection molding the desired article.

* * * * *